United States Patent
Sharma et al.

(10) Patent No.: US 10,459,894 B2
(45) Date of Patent: Oct. 29, 2019

(54) DATABASE SHUTDOWN AND RESTART STABILITY OPTIMIZER

(71) Applicant: Bank of America Corporation, Charlotte, NC (US)

(72) Inventors: Anant Bondalapati Sharma, Telangana (IN); Badelal Rameshwar Prasad Yadav, Mumbai (IN); Rakesh Madanlal Shah, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 508 days.

(21) Appl. No.: 15/273,077

(22) Filed: Sep. 22, 2016

(65) Prior Publication Data
US 2018/0081910 A1    Mar. 22, 2018

(51) Int. Cl.
*G06F 17/30* (2006.01)
*G06F 16/21* (2019.01)
*G06F 16/22* (2019.01)
*G06F 16/23* (2019.01)

(52) U.S. Cl.
CPC .............. *G06F 16/21* (2019.01); *G06F 16/22* (2019.01); *G06F 16/2379* (2019.01)

(58) Field of Classification Search
None
See application file for complete search history.

(56) References Cited

U.S. PATENT DOCUMENTS

| | | | | |
|---|---|---|---|---|
| 7,721,290 B2* | 5/2010 | Horikawa | ............. | G06F 9/4862 709/201 |
| 7,873,602 B2* | 1/2011 | Debrunner | ............. | G06F 16/27 707/661 |
| 7,941,445 B2* | 5/2011 | Motoyama | ............. | G06Q 10/06 707/790 |
| 8,135,765 B2* | 3/2012 | Schuler | ............. | G06F 9/541 707/829 |
| 8,826,264 B1* | 9/2014 | Chhabra | ............. | G06F 8/656 717/170 |
| 9,021,299 B2* | 4/2015 | Douros | ............. | G06F 9/485 714/15 |

(Continued)

OTHER PUBLICATIONS

Free SQL Server Monitoring Tool, © 2006-2011 Spiceworks, Inc. , 1 page.

(Continued)

*Primary Examiner* — Debbie M Le
(74) *Attorney, Agent, or Firm* — Banner & Witcoff, Ltd.; Michael A. Springs

(57) ABSTRACT

A separate, central server operating in a system including one or more database server machines and a graphical user interface displayed on a user's computer is disclosed and provides a technological improvement. In one example, computer-readable instructions are stored in computer memory on this shutdown control server. A user, such as a database administrator, may access the shutdown control server to initiate the shutdown, reboot, and/or restart of database services on one or more separate database servers. At least one advantage of such an arrangement is that the shutdown control server provides plug-and-play capabilities that may allow one or more database servers of one or more different database types to concurrently connect to the shutdown control server.

20 Claims, 7 Drawing Sheets

(56) References Cited

U.S. PATENT DOCUMENTS

| | | | |
|---|---|---|---|
| 9,286,106 B1* | 3/2016 | Huang | G06F 9/4881 |
| 9,294,585 B2* | 3/2016 | Druet | G06F 9/4856 |
| 9,881,034 B2* | 1/2018 | Horowitz | G06F 16/211 |
| 2002/0065879 A1 | 5/2002 | Ambrose et al. | |
| 2007/0168228 A1 | 7/2007 | Lawless | |
| 2008/0070495 A1 | 3/2008 | Stricklen et al. | |
| 2009/0245236 A1 | 10/2009 | Scott et al. | |
| 2011/0258083 A1 | 10/2011 | Ren | |
| 2013/0073473 A1 | 3/2013 | Heath | |
| 2017/0161051 A1* | 6/2017 | Nikam | G06F 8/65 |

OTHER PUBLICATIONS

SQL Server Monitoring Management Pack, © 2011 Microsoft, 5 pages.
Spotlight on SQL Server Enterprise, Operational Monitoring, Diagnostics, Administration and Automated Tuning for SQL Server, © 2011 Quest Software, Inc., 18 pages.
Foglight, Application Performance Monitoring Made Simplier, © 2011 Quest Software, Inc., 43 pages.
Application Performance Management, © 2011 CA Technologies, 7 pages.

* cited by examiner

DATABASE SHUTDOWN AND RESTART STABILITY OPTIMIZER

RELATED

This application is related to U.S. Pat. No. 8,930,395 (Sharma et al.), which issued on Jan. 6, 2015, with title, "Proactive Monitoring of Database Servers," and which is herein incorporated by reference in its entirety.

FIELD

Aspects of the embodiments relate to a database system that provides a technological advancement over existing database systems by automatically verifying a stability of, inter alia, one or more database service before allowing shutdown and/or restart/reboot.

BACKGROUND

Prior art database systems experience performance issues and sometimes even malfunction (e.g., hang, premature abort, data loss, and other malfunctioning) when a database server is improperly shutdown and/or restarted. One existing solution to address this problem is to rely upon database administrators to follow a predetermined procedure and/or executed a predetermined script stored on the database server whenever a shutdown command is desired, instead of directly submitting a native command to immediately shutdown the database server. For example, the script could be a MS-DOS batch file (e.g., with a .bat extension) that consists of a series of pre-processing commands concluding with a shutdown command for the database engine. Such solutions include various drawbacks and shortcomings leaving much room for improvement.

Companies, including financial businesses, manufacturing companies, and service-related businesses, often store and maintain databases in distributed or stand-alone form that are supported by numerous database servers. The database servers may be virtually or physically different and may reside at the same or different physical locations. The number of database servers may be very large, spanning tens, hundreds, or even thousands of physical and/or virtual computing machines. Consequently, a company may assign different database servers to different database administrators so that the each database server can be accessed and maintained in a reasonable manner. However, with the partitioning of database server responsibilities, a database administrator sometimes must expend an inordinate amount of time to adequately monitor (e.g., shutdown/reboot/restart) assigned database servers on a recurring basis.

With traditional systems, a database administrator may investigate a particular database server for relevant status information by manually logging into an identified database server and performing health checks, one server at a time. To the extent this requires a sequence of steps to be performed on the server, the process can be time consuming and cumbersome. Needless to say, the above-described process further reduces the productivity of the database administrator. Moreover, the number of generated status indications is often quite large and many indications may be irrelevant to the proper operation (e.g., shutdown, reboot, and/or restart) of a database service. Consequently a database administrator may spend a substantial amount of time on a database server that does not need further investigation.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for monitoring a plurality of database servers to mitigate server shutdown risks. The plurality of servers may be monitored to determine a database status at a database server before a shutdown command (or restart/reboot command) is submitted to the database service.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be implemented as computer-readable instructions stored on a computer-readable medium, such as a non-transitory computer-readable medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the disclosure will occur to persons of ordinary skill in the art from a review of this disclosure. For example, one of ordinary skill in the art will appreciate that the steps illustrated herein may be performed in other than the recited order, and that one or more steps illustrated may be optional in accordance with aspects of the disclosure.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
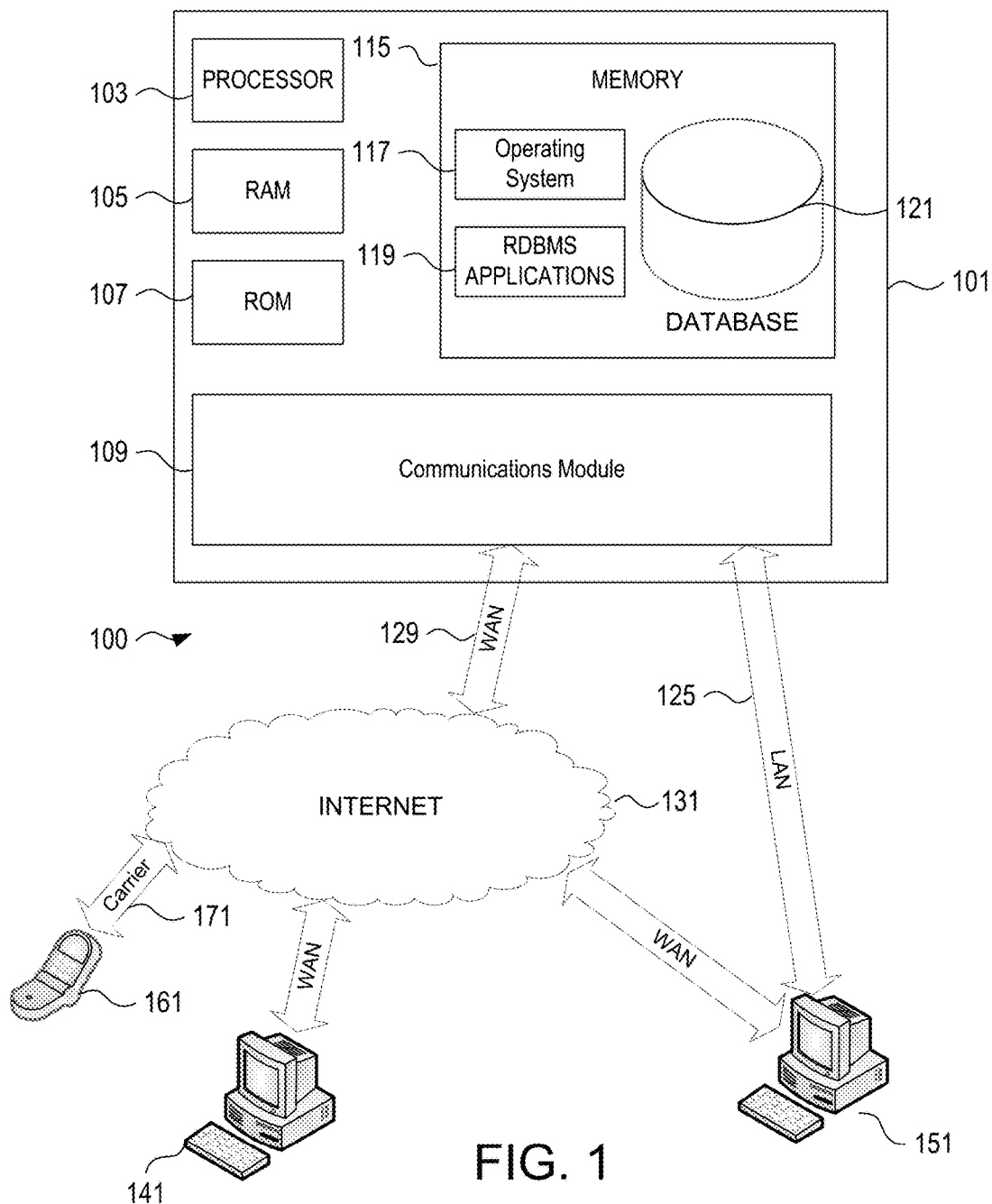
FIG. 1 illustrates an example of a suitable computing system environment that may be used according to one or more illustrative embodiments.

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

The features disclosed herein overcome one or more drawbacks in prior art database systems to provide a technological improvement. In one example, computer-readable instructions are stored in computer memory on a separate, central server, which may sometimes be referred to as a shutdown control server 308. A user, such as a database administrator, may access the shutdown control server 308 to initiate a shutdown, reboot, and/or restart of database services on a separate database server 302. At least one advantage of such an arrangement is that the shutdown control server provides plug-and-play capabilities that may allow one or more database servers 302-304 (of one or more different database types) to concurrently connect to (e.g., communicate with) the shutdown control server 308.

In accordance with various aspects of the embodiments, a computer system processes status information from database servers supporting a database type, including a relational database, e.g., structured query language (SQL). The computer system interfaces with a plurality of database servers to mitigate premature/inappropriate server shutdown/restart/reboot risks. Database administrators may span many relational database management systems (RDBMS) and may have common areas of interest that are monitored on a daily basis. A user display, e.g., a graphical user interface, may be tailored according to a selected RDBMS product, and coded by color to indicate the status of individual SQL Server \ RDBMS features for each monitored SQL server. The GUI may include a customized web/Internet user interface and scripts to support interactive and batch mode operations. In addition, traditional database monitoring systems often monitor database servers on behalf of a database administrator as a background process on each of the listed database servers. Issues regarding the database servers are often times reported though e-mail and/or short message service (SMS). Moreover, the computer system may support different types of businesses that utilize a database server infrastructure, including financial, information technology (IT), and manufacturing companies. For example, control reports may be generated to facilitate database administrators; DBA managers can also generate variety of control reports to ensure effectiveness of the shutdown control server's functionality.

According to one or more aspects, an automated process that executes at a shutdown control server, monitors features for a set of databases and servers that are distributed over a plurality of structured query language (SQL) database servers 302. SQL server features may include: log shipping, database mirroring, replication, SQL agent jobs, security baseline, SQL server patch level, fixed disk free space, database status and available space, performance counters, and SQL error log. The automated process typically offers a substantial time savings with respect to traditional systems, which sometimes require manually examining each SQL server for health checks before a shutdown.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including random-access memory (RAM) 105, read-only memory (ROM) 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, receipts to digital files.

Although not shown, RAM 105 may include one or more are applications representing the application data stored in RAM 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Also, some or all of the computer executable instructions for computing device 101 may be embodied in hardware or firmware.

Computing device 101 may operate in a networked environment supporting connections to one or more remote computing devices, such as computing devices 141, 151, and 161. The computing devices 141, 151, and 161 may be personal computing devices or servers that include many or all of the elements described above relative to the computing device 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, computing device 101 may be connected to the LAN 125 through a network interface or adapter in the communications module 109. When used in a WAN networking environment, the computing device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 119 used by the computing device 101, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 101. Such a processor may execute computer-executable instructions stored on a computer-readable medium.

Figure 2:
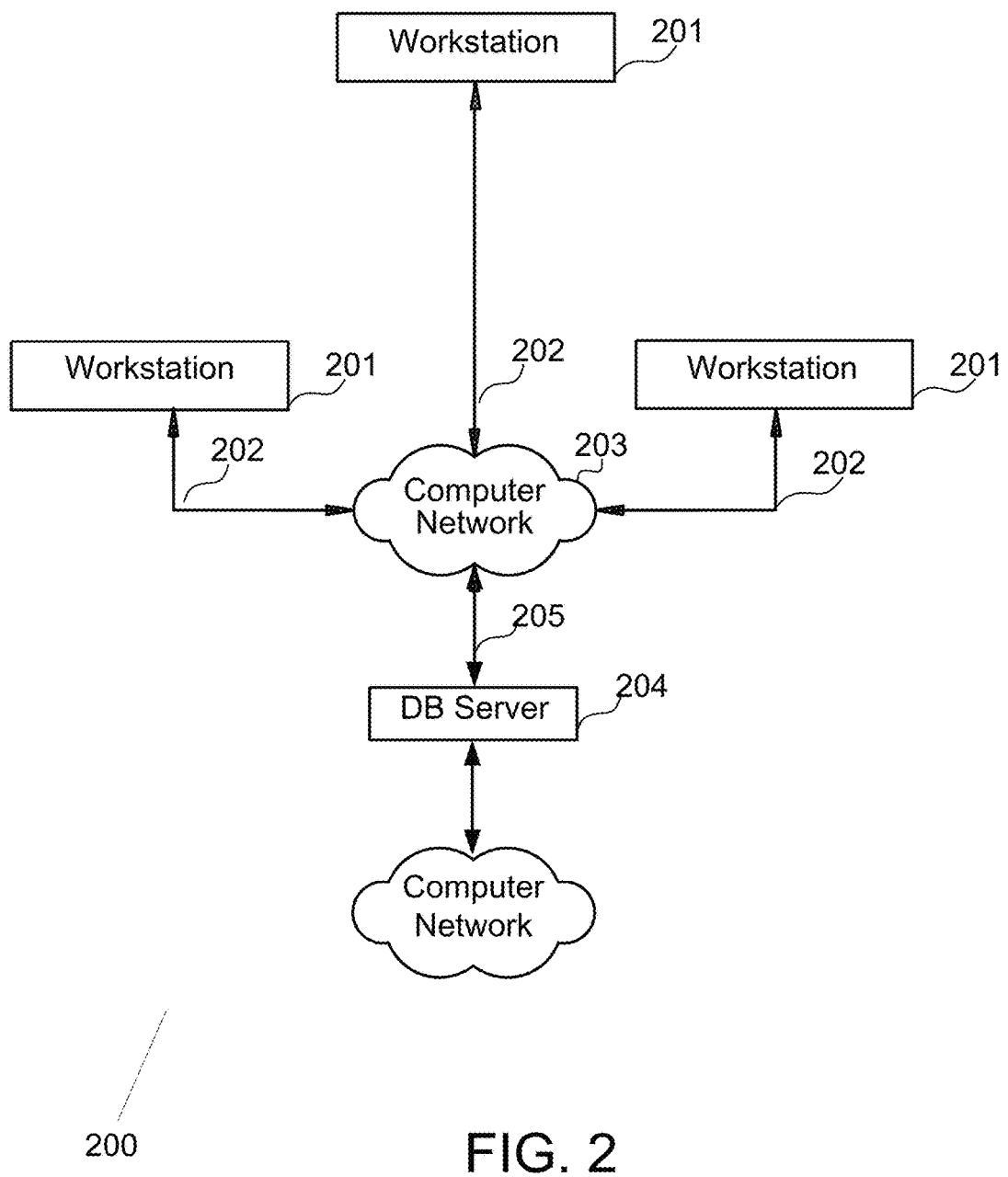
FIG. 2 shows an illustrative system for implementing example embodiments according to the present disclosure.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, and hard-wired links.

The steps that follow in the Figures may be implemented by one or more of the components in FIGS. 1 and 2 and/or other components, including other computing devices.

Figure 3:
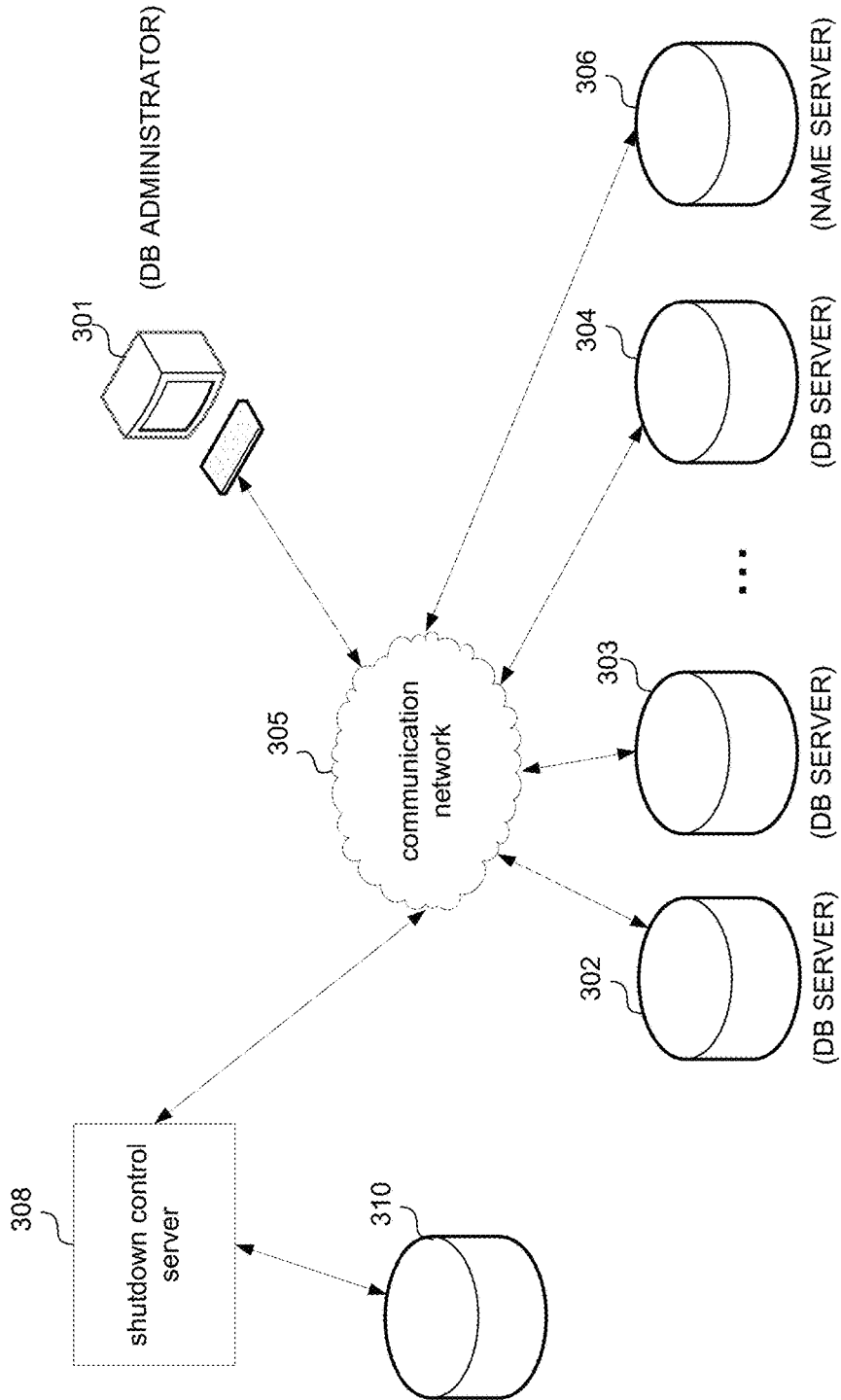
FIG. 3 shows a system with a plurality of database servers in communication with a shutdown control server in accordance with an aspect of the disclosure.

FIG. 3 shows system 300 with a plurality of database servers 302, 303, and 304 in accordance with an aspect of the disclosure. Computer 301 (associated with a database administrator) communicates through shutdown control server 308 over communication network 305 to interacts with database servers 302-304. The shutdown control server 308 may communicate with a data store 310 comprising rules and/or commands for execution on one or more database servers 302-304. Optionally, data store 310 may be included as part of shutdown control server 308 as, for example, memory storage inside the server 308.

As will be further discussed, processes (e.g., processes 400, 500, 600, and/or 700 as shown in their respective figures) are executed on computer 301 of the database administrator in order to regulate shutdown/reboot/restart of database servers 302-304. To facilitate regulated shutdown, the database servers are identified in server information stored at data store 310. In some examples, data store 310 may be integrated with computer 301 to ensure that a database administrator has access only to those database servers that the administrator is authorized.

Database servers 302-304 may serve different types of databases, including a relational database, e.g., SQL database, object-oriented databases, linear databases, self-referential databases, and other types of databases. With one aspect, different RDBMS technologies may be supported under a multi-generation plan. Therefore, in some embodiments in accordance with various aspects of the disclosure, a shutdown control server 308 may include a plug-and-play capability to permit the server 308 to communicate (e.g., handshake) with a database server 302, 304 to identify its type and/or other characteristics/attributes before establishing a connection for data transfer.

With some embodiments, the processes executing on a database administrator's computer 301 may support a graphical user interface (GUI) that provides on a database (DB) administrator's desktop a near real-time view of multiple SQL server instances. Because, in those embodiments, monitoring configuration is not required on a SQL server, the GUI tool may appear to be essentially instantaneous to the DB administrator so that any newly built SQL server can be viewed without having to prepare the server from monitoring stand point (e.g., to provide a plug-and-play like functionality).

In some examples, information about the SQL Server status is presented in a graphical user interface (GUI) format where status information for all of the listed database servers is presented in one integrated view in an automated manner. According to one or more additional aspects, an automated monitoring process executes on a shutdown control server 308, and the output is presented on a user's computer 301, without any custom executable files being installed on the Database Servers 302, 304. The user may set the refresh time for updating the GUI and may initiate the monitoring of the SQL servers by the automated process.

The monitoring process may read a list of SQL Server Instances from a designated Server detail repository (in form of a Database) of organization or from a flat text input file and then connects to each listed SQL server to query the System Catalogs of the SQL Server engine. Because the monitoring process runs from the central server 308, configuration demand at the SQL server's side 302 is circumvented. The monitoring process interprets the received information from the SQL servers and updates the GUI. By monitoring and obtaining additional information about SQL features for specified servers through the GUI, the database administrator or any other user (or self-learning analytics engine) may then report and/or fix detected issues.

According to one or more aspects, the GUI 405 is color-coded to indicate the status of individual SQL features for each monitored SQL server. The process analyzes each SQL feature one by one, and based on the received status information color codes the feature as presented by the GUI. For example, a ready status (i.e., ready for shutdown/reboot), a near ready status, and a not ready status may be color-coded as green, yellow, and red, respectively.

According to one or more aspects, the GUI 405 virtually brings a set of database servers on a database administrator's desktop presenting a live and "at a glance" view. Frequent live view of database servers may assist the database administrator to become more familiar with a database server and its behavior. This approach may assist the database administrator to predict certain types of issues with a database service shutdown/reboot/restart before the issues occur.

With some alternative embodiments, the GUI processes executing on computer 301 may provide monitoring that is proactive rather than reactive because the monitoring is not predicated on status indications. Also, the processes may circumvent the need for configurations, agents, or components at database servers 302-304 and for an extra layer of intermediate messaging dependency (e.g., e-mail, alerts, messaging). Also, the processes may use a standard 32-bit operating system, thus circumventing a complicated monitoring infrastructure that demands an extra skill sets and significant cost with infrastructure dependency.

Regarding FIG. 3, a database (DB) administrator logs into computer 301. Computer 301 uses the DB administrator's login identification to pull the database server list from name server 306 for servers assigned to the database administrator. As will be further discussed, name server 306 is identified through a suitable naming format, i.e., IP address, where the server name is contained in registry at computer 301. Computer 301 logs into a particular database server 302 on behalf of the DB administrator at a desired time and establishes a connection to the database server. For example, the database administrator may configure a refresh interval so that assigned database servers are queried during each refresh interval to update the status information. The connection may be established from the desktop of computer 301 rather than an agent running on a database server.

Computer 301 receives status information from database servers 302-304, interprets the results and color codes database feature information that is displayed in GUI labels accordingly. Looking at the color (e.g., green, yellow, or red) imposed in the GUI labels, the DB administrator may obtain an expeditious view about the status of database servers 302-304. The DB administrator may then obtain detailed information about database servers features that appear to have a status issue. With some embodiments, a DB administrator may obtain status information from a particular database server about SQL features for the assigned database servers. For example, exemplary SQL features may include the following.

LogShipping—High availability technique that keeps two copies of the database for DR readiness. The copy database should contain same data as its main production database.

DB Mirroring—Another high availability technique that keeps two copies of the database for disaster recovery (DR) readiness. The copy database should contain the same data as its main production database.

DB Replication—Maintaining multiple copies of same data across multiple sites (distribute across sites). It also provides high availability for DR readiness. A set of complicated components should be monitored to ensure that all the sites have right and latest data.

Failover Cluster—Redundant servers form a group and appear as if a single server to applications. Failure of one machine invokes other machine in group to take over the application request that is transparent to client.

Memory Pressure—Examines server memory utilization and detects possible memory pressure server may run under.

CPU Pressure—Examines server processor utilization and detects possible CPU bottleneck.

IO— Examines servers disk subsystem read/write operations to detect possible IO bottleneck.

Database Status—Examines available free space within database files, readiness to accept transaction, and/or DB configuration per organization standards (file location, mode).

Free Disk Space—Examines that all the drives on server has >20% free space at least.

SQL Related Services—Examines that all the required and important SQL related services are running on the SQL server.

Database Statistics—Examines outdated Statistics to ensure optimum query performance.

Patch Level—Latest recommended patch level must be ensured to keep the servers up to date, optimum, secure and compliant within organization.

User Access Level—Adherence to organization's security guidelines. Proactive detection saves a lot of audit failure while maintains a compliant and secured database servers.

Database users without any database roles assigned within database.

Memory configuration—according to recommendation for 32-bit and 64-bit systems.

SQL Services Service accounts (for a domain account)

Database file Autogrowth related settings.

SQL Server scheduled Jobs status (success, failure or hung)—checks if a job missed its defined schedule.

SQL Server Error Log—reported errors that may cause business outage in due course of time if couldn't be noticed.

Database Backups sent to Tapes

Database Backup is NOT too old.

Detection of a recent Server Reboot and a SQL Recycle—Fatal error may cause automatic frequent reboots.

The DB administrator may use the status and detailed information provided by monitoring block to remediate and/or report the SQL issue for the corresponding SQL server. In addition, the DB administrator may use a shutdown control server 308 to automatically verify a stability of one or more database service running on a database server 302 before allowing shutdown and/or restart/reboot of that server, as disclosed herein.

Figure 4:
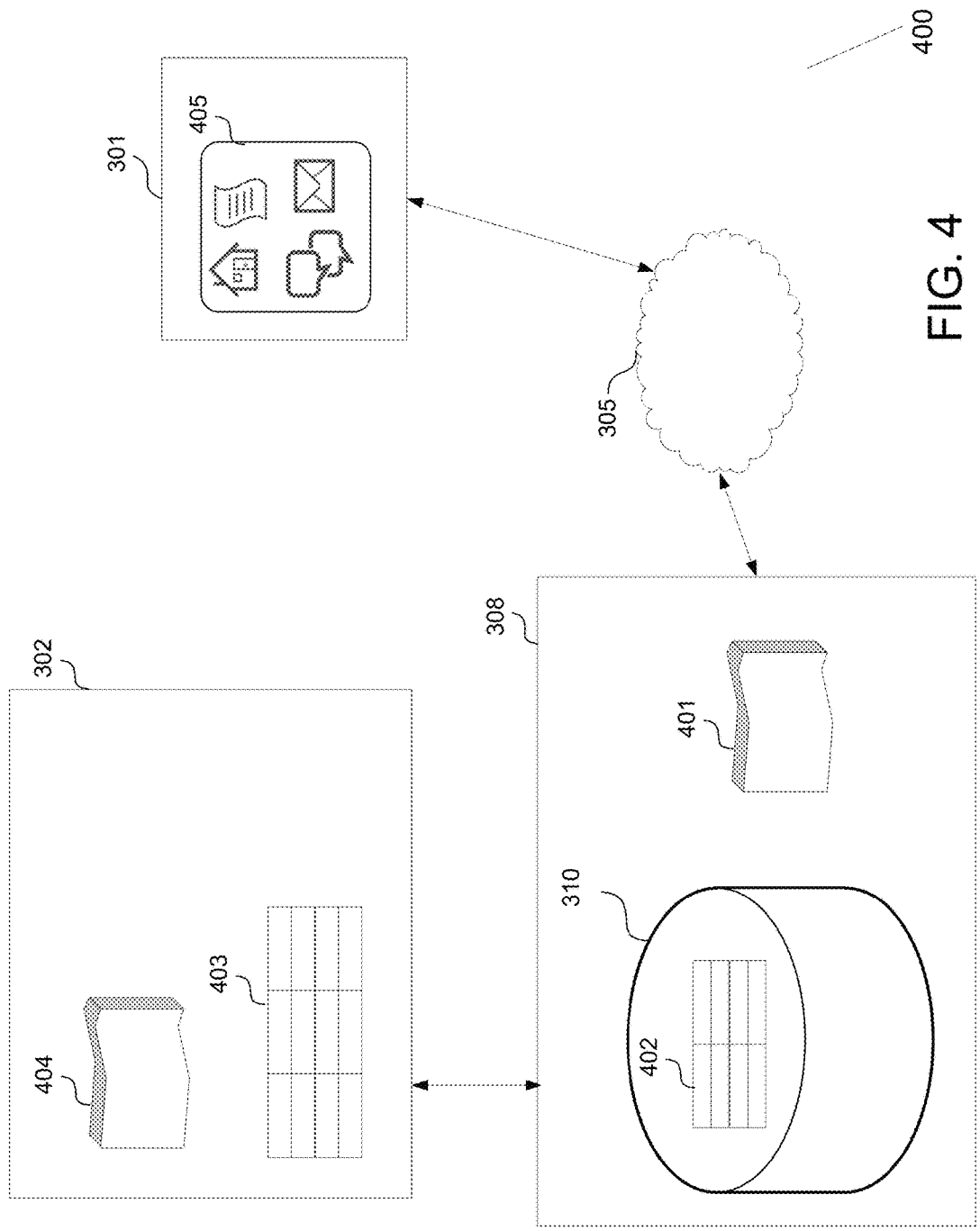
FIG. 4 shows a system diagram of a shutdown control server in communication with a database administrator's computer in accordance with an aspect of the disclosure.

Regarding analytics, with reference to FIG. 4, a data store 310 may additionally serve as a repository for data to assist a system 400 with a self-learning analytics engine 401. The repository 310 may store and analyze historical records 402 and use them to forecast common issues that a particular database server 302 has undergone in past. In one example, the system 400 may store various error numbers/IDs from logs and use them to auto-learn using the self-learning analytics engine 401 about how to handle and process specific error IDs (or types of error IDs) in the future. In the event of a new (e.g., previously unseen for the database server) error number/ID, the graphical user interface 405 on the database administrator's computer 301 may seek input from the user, and then record the sequence of actions for future occurrences of the error ID in the same context. Regardless of shutdown/recycle events, the self-learning analytics engine 401 may perform periodic analytics/self-learning on the database servers 302, 303, 304 to seek out and forecast hidden problems. It may do this by customizable configuration data saved \ defined by database administrators for given database server(s) and/or database types.

FIG. 4 shows high-level diagram 400 for a shutdown control server 308 that allows a user, such as a database administrator using a computer 301, to initiate the shutdown, reboot, and/or restart of database services on a separate database server 302 storing data tables 403. In some examples, the shutdown control server 308 provides plug-and-play capabilities that allow one or more database servers 302-304 (of one or more different database types) to concurrently communication with the shutdown control server 308. The concurrency feature and plug-and-play like feature alleviate some of the issues with traditional database server monitoring systems where DB administrators manually log into database servers for health checks. For example in prior art systems, a DB administrator may spend approximately 10 minutes on average on each database server when doing so; with more than 30 to 50 SQL servers assigned, a DB administrator may allocate 5 to 8 hours to this task, thus severely degrading the DB administrator's productivity. Moreover, based on the practicality of the situation, it may be very unlikely that the DB administrator is able to monitor each database server every day.

The features provided to a user through the shutdown control server 308 allow for managing of the integrity of databases, including a means for forecasting (e.g., predicting and/or pre-emptively preventing) database errors during database services and/or server shutdown/restart/reboot. The system 300 may verify dependent services status and takes corrective actions within the environment to improve database integrity and stability.

In some examples, the integrity and stability of a database system is improved because the shutdown control server 308 determines the amount of time historically consumed from the initiation of shutdown of a database service 404 until its restarted and ready for transaction processing (e.g., estimated restart time). Then, when a new request is submitted to shutdown/restart a database service, the shutdown control server 308 considers the time before allowing the request to proceed. In one example, the server may use the estimated restart time to check for the possibility of pre-scheduled jobs being skipped/missed during the recycle. Depending on the specific job to be missed, the server 308 may accommodate the pre-scheduled job. In yet another example, the server 308 may check that the database server 302 does not have any pending transaction to validate; as such, saving recovery time while bringing the database service 302 or database service 404 back online.

Similarly, the shutdown control server 308 may look at in-process transactions before allowing the database engine to stop. In some examples, the server 308 may prevent/deny a request for shutdown/restart in case of a long-running transaction is underway on the database server/service.

In some examples, the integrity and stability of a database system is improved because the shutdown control server 308 has the ability to proactively check and forecast the possible chances of database engine (e.g., database service running on the database server 302) getting stuck during restart. Moreover, before initiating recycle of a database server and/or service, the shutdown control server 308 may validate the disaster recovery site synchronization status and take required actions to assure 100% synchronization and/or replication. In some examples, before initiating a recycle, the shutdown control server 308 may check if sufficient and recent enough database backup files are available to handle a possible database crash situation, and block the shutdown operation if the sufficiency check is not satisfied. In another example, the shutdown control server 308 may check the amount of free space in a database log file, and if a space crunch is detected, it may cause free space to be created so that a possible restart error is pre-emptively avoided. In other words, before initiating a recycle, the shutdown control server 308 may auto correct\auto adjust the database server's file free spaces avoiding a file-full situation for the database server 302.

The shutdown control server 308 may also be used for post-shutdown integrity and stability checks. For example, after restarting a database service, the shutdown control server 308 may perform a check of all database and database service logs. In another example, before and/or after recycling, the shutdown control server 308 compares dependent services' status on the database server 302 against a customized list of desired state defined by a database administrator of the server 302. Discrepancies may be fixed to take the services to desired state as given in customization list. In some instances, the shutdown control server 308 may automatically check the dependent services status for the database service/engine and take corrective actions per customized advised pre-established by a database administrator. The aforementioned customization list 402 may be stored in a data store 310 in the shutdown control server 308.

The shutdown control server 308 may, in some examples, assist in improving a user's (e.g., a database administrator) administration of one or more database servers 302, 303, 304. The shutdown control server 308 may include inbuilt real-time notification systems to engage DBAs where immediate DBA attention is required to take decision beyond built in logic of the system 400. It may also notify DBAs on what all steps it has taken during recycle. The notification may occur instantly, and provide DBAs with information about discrepancies and engages the appropriate DBA when a team of DBAs are overseeing a farm of database servers 302, 303, 304. The disclosed server 308 provides flexibility to include & exclude checks in customized manner and also allows DBAs to define customized set of auto corrective actions for given server(s). As such, the shutdown control server 308 safeguards running transactions by, inter alia, notifying DBAs and allowing DBAs to provide customized checks for particular servers 302, 303, 304 and/or consistent inline health checks of core database services/engine operations.

In addition, at least one technological advantage of the shutdown control server 308 is that may run as a central solution without demanding server-side agent implementation. This makes the database servers 302, 303, 304 free from extraneous resource sharing and the solution may be provided as a plug-and-play like fashion. Of course, in other implementations, the system 400 may include server-side code 404 to provide one or more features described herein.

Further to the plug-and-play like capabilities, in some examples, the shutdown control server 308 may automatically detect new database servers 303, 304 added on a network 305 and start performing common set of checks as for other servers. On finding of a new database server 303, the shutdown control server 308 may inform defined set of DBAs (through email or other notifications) and seeks customizations, if any. The shutdown control server 308, through multi-tasking and concurrent processing, may have the ability to handle multiple database server/service recycles in parallel.

Numerous other features are provided to a user through the shutdown control server 308 to allow for managing of the integrity of databases, including during and after database services and/or server shutdown/restart/reboot. In some examples, the integrity and stability of a database system is improved because the shutdown control server 308 pre-checks (e.g., before initiating recycle of the database service) one or more of: any open transactions in process; any database maintenance activity going on; any scheduled job is scheduled within next 10 mins; any DB file is pending to mark completed transaction checks; any live user connections to database engine; any database file is full; status of dependent services against customized state; and if DB synchronization is pending with DR site. Moreover, a database administrator's computing device may be used to define additional checks and/or related scripts. Finally, in the remaining examples, the integrity and stability of a database system may be improved because the shutdown control server 308 post-checks (e.g., after a recycle/reboot has been initiated) one or more of: all databases completed recovery 100%; database and OS error logs are clean (no abnormal events reported); any dependent services are left against the customized \ DBA defines desired state; any scheduled job skipped schedule during the reboot event; site synchronization\replication is intact; and database files have sufficient space to accommodate future 24-hours transactions "at-least".

Figure 6:
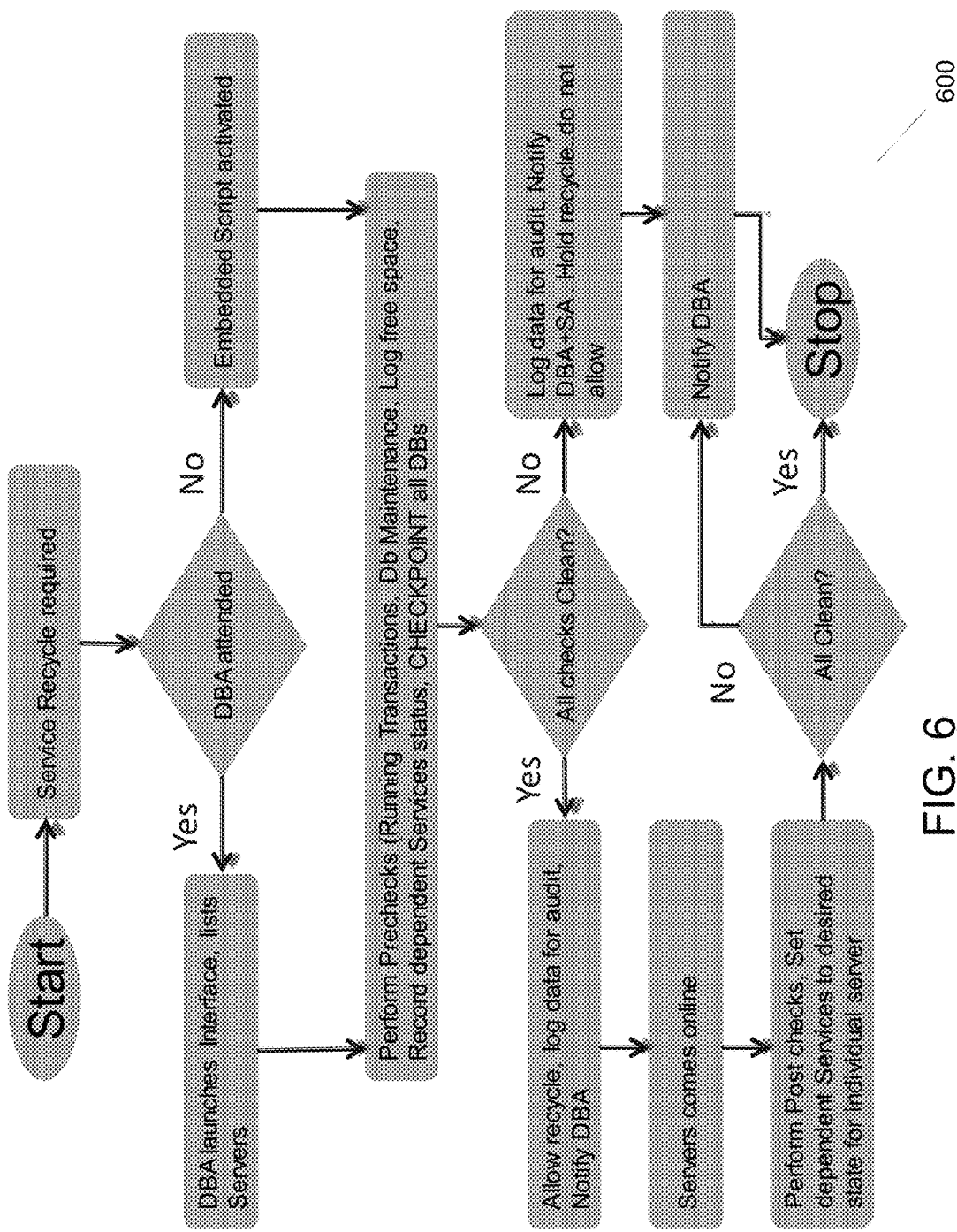
FIG. 6 shows a process for implementing example embodiments according to the present disclosure.

FIG. 6 shows a process 600 in accordance with various aspects of the disclosure. The process 600 discloses some steps that may be automatically performed to verify a stability of one or more database service before allowing shutdown and/or restart/reboot. The process 600 disclosed pre-check and post-check steps that are elaborated upon in other aspects of the disclosure herein, including the preceding paragraph.

Moreover, unlike previous middleware solutions that work at the database engine/service level externally, disclosed herein is a solution that works at the database engine internally and externally, at both levels. In addition, the disclosed solution validates in-process, the transactions before letting the database engine stop, and decisions are based on a customized set of rules set by DBAs. For example, the disclosed solution has the ability to deny database shutdown in case a long running transaction is underway. Moreover, pre-emptively, the disclosed solution has capabilities to proactively check and forecast the possible chances of the database engine/service/server getting stuck during restart. For example, the disclosed solution may check the dependent services' status for the database engine, and takes corrective actions as per customized rules written by DBAs and implemented in the database system 400. For granularity and control, the disclosed solution allows for users (e.g., of computer 301) to define customized checks and rules for every database server 302, 304 and store them in a centralized repository 310 that allows for plug-and-play connectivity. As a result, a customization previously unrecognized and/or unscalable in the art is disclosed. The disclosed centralized, scalable solution is possible because, in some examples, no server-side code is injected onto the database server 304 and the disclosed process steps 700 are administered from and cause to be executed by a central server 308. In other words, although commands (e.g., shutdown) are executed at the database server 304, the origin of the commands is from the central shutdown server 308.

In one example, a user (e.g., database administrator) may interact with the shutdown control server 308 and database servers 302, 304 through the aforementioned graphical user interface 405. In alternate embodiments, the interaction may occur through the use of an automated script that serves as a plug-in to the user's shutdown mechanism, e.g., the software on the user's computing device 301. In such an embodiment, the automated script may perform pre- and post-sanity checks and notifies respective database administrator group(s) in real-time of any discrepancies.

As described in the examples above, the integrity and stability of a database system is improved when the shutdown control server 308 determines the amount of time historically consumed from the initiation of shutdown of a database service 404 until its restarted and ready for transaction processing (e.g., estimated restart time). Then, when a new request is submitted to shutdown/restart a database service, the shutdown control server 308 considers the time before allowing the request to proceed. In one example, the server may use the estimated restart time to check for the possibility of pre-scheduled jobs being skipped/missed during the recycle. Depending on the specific job to be missed, the server 308 may accommodate the pre-scheduled job. In yet another example, the server 308 may check that the database server 302 does not have any pending transaction to validate; as such, saving recovery time while bringing the database service 302 or database service 404 back online. At least one advantage of such a feature in the system 400 is that the shutdown control server 308 may store information about job scheduling 402 in its data store 310 and over time, refine and tweak the information using its analytics engine 401 to more accurately predict such anomalies. As a result, unlike a human database administrator, the system automatically may then predict and assess requests for shutdown/restart/reboot of a database server 302 to accommodate scheduled jobs.

As described in the examples above, the integrity and stability of a database system is improved when the shutdown control server 308 performs post-shutdown integrity and stability checks. For example, after restarting a database service, the shutdown control server 308 may perform a check of all database and database service logs. In another example, before and/or after recycling, the shutdown control server 308 compares dependent services' status on the database server 302 against a customized list of desired state defined by a database administrator of the server 302. Discrepancies may be fixed to take the services to desired state as given in customization list. In some instances, the shutdown control server 308 may automatically check the dependent services status for the database service/engine and take corrective actions per customized advised pre-established by a database administrator. The aforementioned customization list 402 may be stored in a data store 310 in the shutdown control server 308. This ability to take a snapshot of all services/processes/threads running on a database server 302 before restart, and then comparing it to which services/processes/threads are executing after restart, further improves the stability of the database system 400. For example, if particular, custom software threads are important for some background processing, the comparison alerts the user (e.g., database administrator) to further investigate and resolve the potential discrepancy. In other embodiments, an automated command may be executed by a shutdown control server 308 upon detection of the anomaly and based on prior experiences with such anomalies (e.g., using analytics engine 401).

Figure 7:
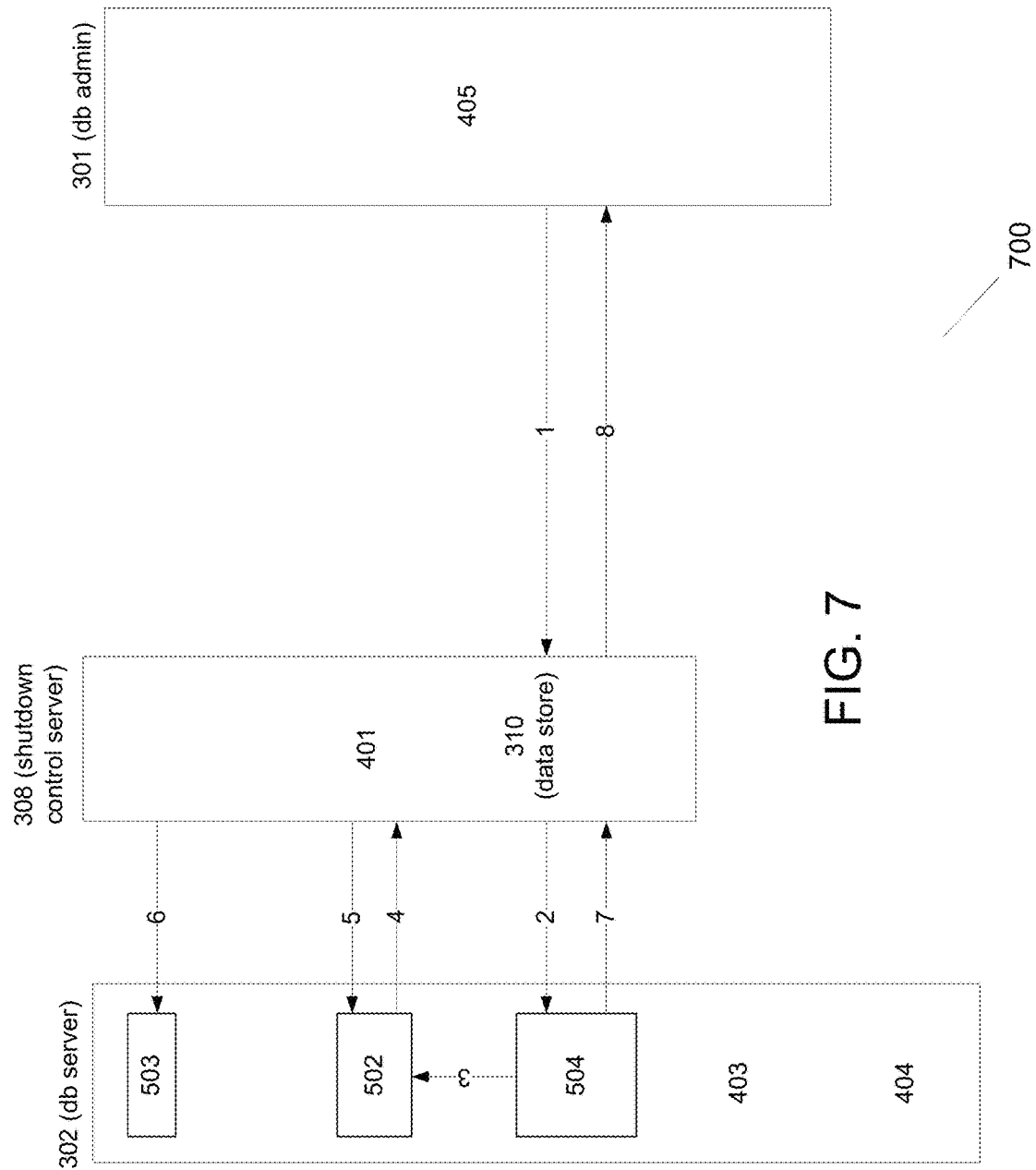
FIG. 7 shows a process for requesting a regulated shutdown/restart request in accordance with an aspect of the disclosure.

FIG. 7 shows a process 700 for requesting a regulated shutdown/restart request to a database server in accordance with an aspect of the disclosure. Through steps 1 through 8 in FIG. 7, a database administrator may interact with a database system showing a technological improvement over prior art database systems. The database administrator user accesses the shutdown control server 308 (in step 1) to initiate a shutdown, reboot, and/or restart of database services on a separate database server 302. Using the data store 310 communicatively coupled to the shutdown control server 308, an appropriate sequence of requests is transmitted (in step 2) to the database server 302. The sequence of requests may comprise a batch file with a series of commands to run on the database server 302. In many examples, the final command may be a shutdown or restart/reboot command. The operating system 504 at the database server 302 receives the incoming request and communicates it (in step 3) to a database engine 502 on the database server 302. In response, the database engine 502 may communicate (in step 4 and step 5) with the shutdown control server 308 to evaluate and assess the status of the database engine 502 for shutdown/restart/reboot. The database engine 502 will not communicate directly with the service control manager 503; rather, the database engine 502 will communicate with the shutdown control server 308 to confirm preparedness for a restart/reboot/shutdown. Upon receiving that confirmation, the shutdown control server 308 will send confirmation (in step 6) to the service control manager 503. The confirmation may come in the form of an operating system return call resulting from an earlier step (e.g., step 2) or other previous command. With the database server 302 in a ready state, the service control manager 503 may then instruct the database server 302 to restart/reboot/shutdown. Upon reboot, the operating system 504 may transmit (in step 7) a notification, through the shutdown control server 308, to (in step 8) the user's computer 301 for display of an updated status of the database server 302.

Figure 5:
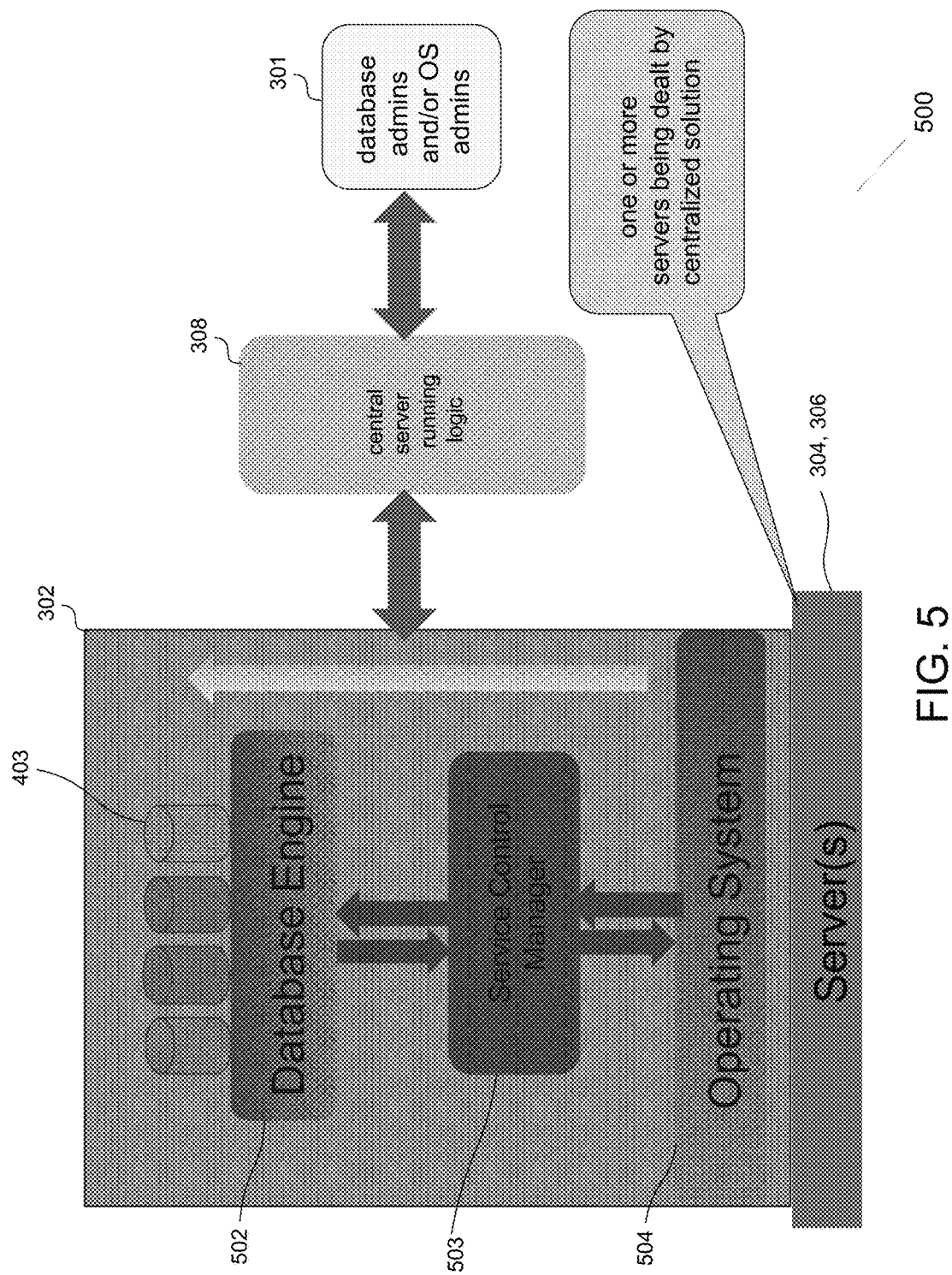
FIG. 5 shows a high-level system diagram of a database server in communication with a database administrator's computer in accordance with an aspect of the disclosure.

In an alternative view of FIG. 7, in FIG. 5 a process 500 is shown for proactively monitoring database servers through a graphical user interface in accordance with an aspect of the disclosure. Process 500 integrates the assigned database servers onto the DB administrator's desktop through the graphical user interface. Consequently, the DB administrator may have a near real-time view of the administrator's database servers at a glance on the desktop. By viewing the health of the assigned DB servers in one integrated view, the DB administrator can work more efficiently while all of the assigned database servers multiple times during the day. In addition, by viewing the near real-time status, the DB administrator becomes more familiar with the operating characteristics of the assigned database servers. The graphical user interface (GUI) is configured and loaded onto the desktop of the DB administrator. For example, the DB administrator may select and order some or all of the SQL features as discussed above based on the needs of the administrator. Process 500 establishes the refresh time interval for updating the status information on the graphical user interface. For example, the DB administrator may set the refresh time by entering the desired time (e.g., 20 minutes). With some embodiments, setting the refresh time may be optional for the database administrator. For example, the refresh time may be set to a default value.

In one example, the database system 300 may include a self-referential database as described in U.S. Pat. Nos. 6,151,604 and 6,163,775, both of which are herein incorporated by reference in their entireties. When the database server 302 is structured as a self-referential database, the database system may operate with a technological advancement previously unavailable to non-self-referential designs. Moreover, the data collected, analyzed, and created in data store 402 in the shutdown control server 308 is different when the database servers 302, 304 involve self-referential designs. Meanwhile, in other examples, the database servers 302, 303, 304 may operate under a non-self-referential design while simultaneously taking advantage of one or more features described herein.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain records on behalf of the company).

We claim:

1. An apparatus comprising a shutdown control server machine, separate from a database server machine, communicatively coupled with a database administrator machine and the database server machine, the shutdown control server machine comprising:
    a processor configured to executed computer-executable instructions;
    a memory storing computer-executable instructions that, when executed by the processor, cause the shutdown control server machine to perform steps comprising:
        receiving a request to evaluate shutdown status of the database server machine from a database engine of the database server machine, the database server machine comprising a service control manager without communication with the database engine;
        determining that a predetermined criterion has not been met;
        postponing shutdown of the database server machine until the predetermined criterion has been met; and
        instructing the service control manager to shutdown the database server machine.

2. The apparatus of claim 1, wherein the predetermined criterion has not been met when the database server machine has a future job scheduled during a downtime resulting from the shutdown of the database server machine, and the predetermined criterion has been met once the future job is completed.

3. The apparatus of claim 1, wherein the memory of the shutdown control server machine stores database administration rules, database configuration information, and historical data about database discrepancies with corresponding responses.

4. The apparatus of claim 3, wherein the steps performed by the shutdown control server machine further comprise issuing a sequence of commands to the database server machine for execution, wherein the sequence of commands concludes with a restart command.

5. The apparatus of claim 3, wherein the steps performed by the shutdown control server machine further comprise issuing a sequence of commands to the database server machine for execution, wherein the sequence of commands comprises at least one of: a restart command and a shutdown command.

6. The apparatus of claim 1, wherein the shutdown control server machine is configured to concurrently communicate with a plurality of database server machines.

7. The apparatus of claim 1, wherein the shutdown control server machine stores database configuration information comprising database name and database type to permit a dynamic, plug-and-play feature for connecting with a plurality of database server machines of different database types.

8. The apparatus of claim 1, wherein the shutdown control server machine obtains a snapshot of the database server machine before issuing a restart command.

9. The apparatus of claim 8, wherein the shutdown control server machine compares the snapshot of the database server machine to a saved snapshot of the database server machine to determine if the predetermined criterion has been met.

10. The apparatus of claim 1, wherein the database server machine runs a relational database.

11. The apparatus of claim 1, wherein the database server machine runs a non-relational database.

12. The apparatus of claim 1, wherein the predetermined criterion has not been met when a log file of the database server machine is substantially full.

13. A computer-assisted method involving a shutdown control server machine, separate from a database server machine without agent implementation, communicatively coupled with a database administrator machine and the database server machine, the method comprising:
  determining, by the shutdown control server machine, that a predetermined criterion has not been met;
  postponing, by the shutdown control server machine, shutdown of the database server machine until the predetermined criterion has been met; and
  issuing, by the shutdown control server machine, a sequence of commands to the database server machine for execution.

14. The method of claim 13, wherein the predetermined criterion has not been met when the database server machine has a future job scheduled during a downtime resulting from the shutdown of the database server machine, and the predetermined criterion has been met once the future job is completed.

15. The method of claim 13, wherein the shutdown control server machine is configured to concurrently communicate with a plurality of database server machines.

16. The method of claim 13, wherein the shutdown control server machine obtains a snapshot of the database server machine before issuing a restart command, and compares the snapshot of the database server machine to a saved snapshot of the database server machine to determine if the predetermined criterion has been met.

17. A non-transitory computer-readable storage medium storing computer-executable instructions that, when executed, cause a processor at least to perform operations comprising:
  determining, by a shutdown control server machine, separate from a database server machine without agent implementation, but communicatively coupled with a database administrator machine and the database server machine, that a predetermined criterion has not been met;
  postponing, by the shutdown control server machine, shutdown of the database server machine until the predetermined criterion has been met; and
  issuing, by the shutdown control server machine, a sequence of commands to the database server machine for execution.

18. The non-transitory computer-readable storage medium of claim 17 storing computer-executable instructions, wherein the predetermined criterion has not been met when the database server machine has a future job scheduled during a downtime resulting from the shutdown of the database server machine, and the predetermined criterion has been met once the future job is completed.

19. The non-transitory computer-readable storage medium of claim 17 storing computer-executable instructions, wherein the shutdown control server machine is configured to concurrently communicate with a plurality of database server machines.

20. The non-transitory computer-readable storage medium of claim 17 storing computer-executable instructions, wherein the shutdown control server machine obtains a snapshot of the database server machine before issuing a restart command, and compares the snapshot of the database server machine to a saved snapshot of the database server machine to determine if the predetermined criterion has been met.

* * * * *